928M271 SR
OR T 867,020

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 80 cents per sheet.

Applications published under the Defensive Publication Program have not been examined as to the merits of alleged invention. The Patent Office makes no assertion as to the novelty of the disclosed subject matter.

PUBLISHED OCTOBER 28, 1969

867 O.G. 1093

820,709

FLUIDIZED POLYMERIZATION OF POLYMERS USING APPARATUS HAVING CONICAL INTERNAL SURFACE

Thomas H. Strickland and Charles J. Kibler, both of P.O. Box 511, Kingsport, Tenn. 37662

Continuation of application Ser. No. 617,415, Feb. 20, 1967. This application Apr. 28, 1969. Published Oct. 28, 1969

Int. Cl. C08g *17/003*
U.S. Cl. 260—75
1 Sheet Drawing. 15 Pages Specification

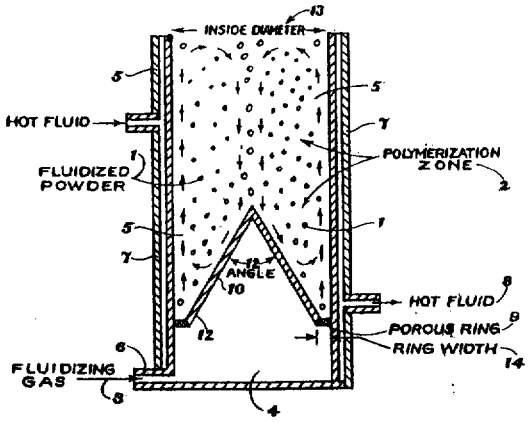

Rapid build-up of a linear prepolymer (for example, polyester, polyamide, etc.) is accomplished by a new process using novel apparatus, said process comprising the solid phase polymerization of a fluidized bed of prepolymer in a cylindrical vessel having an inverted nonporous cone at its bottom, said cone being attached to the vessel by a porous ring through which a fluidizing gas (for example, nitrogen, etc.) is introduced.

928M271 SR
OR T 867,020
T867,020
820709
Oct. 28, 1969 T. H. STRICKLAND ET AL DEF. PUB.
FLUIDIZED POLYMERIZATION OF POLYMERS USING APPARATUS HAVING CONICAL INTERNAL SURFACE
Original Filed Feb. 20, 1967
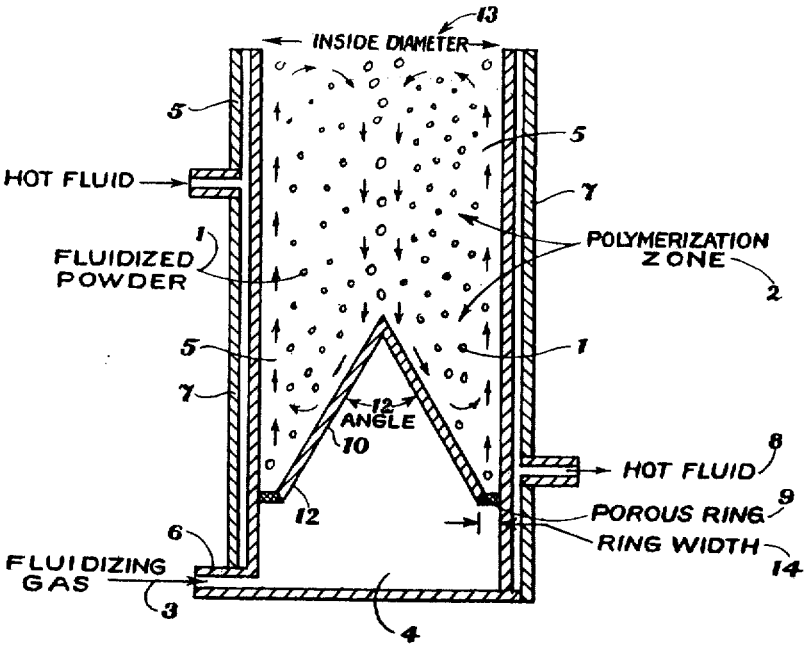
Thomas H. Strickland
Charles J. Kibler
INVENTORS
BY R. Frank Smith
Charles L. Good
ATTORNEYS